(12) United States Patent
Kim et al.

(10) Patent No.: US 8,717,337 B2
(45) Date of Patent: May 6, 2014

(54) PHOTO SENSING TOUCH SENSING LIQUID CRYSTAL DISPLAY DEVICE

(75) Inventors: Cheol-Se Kim, Dalseo-gu (KR); Wook Jeon, Daejeon (KR); Jae-Won Shin, Chilgok-gun (KR)

(73) Assignee: LG Display Co., Ltd., Seoul (KR)

( * ) Notice: Subject to any disclaimer, the term of this patent is extended or adjusted under 35 U.S.C. 154(b) by 1013 days.

(21) Appl. No.: 12/647,223

(22) Filed: Dec. 24, 2009

(65) Prior Publication Data

US 2011/0069020 A1  Mar. 24, 2011

(30) Foreign Application Priority Data

Sep. 24, 2009  (KR) .................. 10-2009-0090598

(51) Int. Cl.
*G06F 3/042* (2006.01)

(52) U.S. Cl.
USPC ........................................... 345/176

(58) Field of Classification Search
USPC .................................. 345/176, 175
See application file for complete search history.

(56) References Cited

U.S. PATENT DOCUMENTS

| | | | | |
|---|---|---|---|---|
| 2006/0227120 A1* | 10/2006 | Eikman | ............... | 345/175 |
| 2006/0244693 A1* | 11/2006 | Yamaguchi et al. | ........... | 345/76 |
| 2007/0268206 A1* | 11/2007 | Kinoshita et al. | ............... | 345/30 |
| 2008/0029691 A1* | 2/2008 | Han | ............... | 250/224 |
| 2008/0055498 A1* | 3/2008 | Abileah et al. | ............... | 349/12 |
| 2008/0198143 A1* | 8/2008 | Kinoshita et al. | ............ | 345/175 |
| 2008/0252618 A1* | 10/2008 | Chung et al. | ............... | 345/175 |
| 2008/0278665 A1* | 11/2008 | Uemoto | ............... | 349/106 |
| 2009/0161051 A1* | 6/2009 | Fukunaga et al. | ............ | 349/115 |
| 2009/0225058 A1* | 9/2009 | Tateuchi et al. | ............... | 345/175 |
| 2010/0053118 A1* | 3/2010 | Chen | ............... | 345/175 |
| 2010/0079409 A1* | 4/2010 | Sirotich et al. | ............... | 345/175 |
| 2010/0220269 A1* | 9/2010 | Takama et al. | ............... | 349/106 |
| 2011/0063243 A1* | 3/2011 | Kim et al. | ............... | 345/174 |
| 2011/0096021 A1* | 4/2011 | Kim et al. | ............... | 345/174 |

FOREIGN PATENT DOCUMENTS

JP  2007-310628  11/2007

* cited by examiner

*Primary Examiner* — Claire X Pappas
*Assistant Examiner* — Robert Stone
(74) *Attorney, Agent, or Firm* — McKenna Long & Aldridge LLP (57) ABSTRACT

A touch panel embedded liquid crystal display device is disclosed. A touch panel embedded liquid crystal display device includes a first substrate having a plurality pixels defined in a matrix, a second substrate comprising first, second and third color filters to form a first, second and third color sub-pixels. A second substrate is opposed to the first substrate. A first photo-sensor is provided on the first substrate in a region corresponding to the first color sub-pixel and a second photo-sensor is provided on the first substrate in a region corresponding to the second or third color sub-pixel. A liquid crystal layer is provided between the first substrate and the second substrate, with a first planarization plate and a second planarization plate formed on rear surfaces of the first substrate and the second substrate, respectively, a wave guide formed on the second planarization plate, and a light emitting diode adjacent to the wave guide to emit and transmit a first color light to be sensed by one of the photo sensors.

16 Claims, 4 Drawing Sheets

FIG. 1

Related Art

PHOTO SENSING TOUCH SENSING LIQUID CRYSTAL DISPLAY DEVICE

CROSS REFERENCE TO RELATED APPLICATION

This application claims the benefit of the Patent Korean Application No. 10-2009-0090598, filed on Sep. 24, 2009, which is hereby incorporated by reference as if fully set forth herein.

BACKGROUND OF THE DISCLOSURE

1. Field of the Disclosure

The present invention relates to a liquid crystal display device, more particularly, to a touch panel embedded liquid crystal display device that is able to allow soft touch and to recognize touch stably, regardless of intensity of illumination such as external lights, reflected lights and the like.

2. Discussion of the Related Art

Recently display technology for presenting electric information signal visibly has been developed rapidly and various thinner and lighter flat display devices having excellent power consumption efficiency have been developed correspondingly only to be replaced with cathode ray tube (CRT) devices.

Such a flat display devices may include a liquid crystal display (LCD), plasma display panel (PDP), field emission display (FED) and electro-luminescent display device (ELD) device and the like.

Such flat display devices typically include flat display panels capable of presenting images. Such flat display panels generally include a pair of transparent insulation substrates having a luminescent or planarizing material provided there between. Among such flat display devices, liquid crystal displays control light permittivity using an electric field to display images. For that, an LCD device includes a display panel having a liquid crystal between two transparent substrates, a backlight unit emitting a light to the display panel and a driving circuit for driving the backlight unit and the liquid crystal.

In a liquid crystal display device, a display panel generally has plural unit pixel regions defined by plural gate lines and data lines that cross to form a matrix. A thin film transistor array substrate and a color filter array substrate face each other with a space provided between the two substrates to form a uniform cell gap. A liquid crystal is provided in the cell gap in each of the unit pixel regions.

The thin film transistor array substrate includes the gate and data lines, a thin film transistor formed at each cross portion between the gate and data lines as switching device, a pixel electrode at each unit pixel region or cell to be connected to the thin film transistor, and an alignment layer coated on the above elements. The gate and data lines receive signals from the driving circuits via pad parts for them, respectively.

Each thin film transistor responds to a scan signal supplied to the gate line and supplies a pixel voltage signal supplied to the data line to the pixel electrode for a given unit pixel region.

The color filter array substrate includes color filters formed to correspond to unit pixel regions, a black matrix for isolating the color filters and for reflecting external light, a common electrode for supplying a reference voltage to the unit pixel regions commonly, and an alignment layer coated on the above elements.

The thin film transistor substrate and the color filter array substrate are usually fabricated independently and then aligned and attached to each other. After that, liquid crystal may be provided after attachment by injection or before attachment using a "one drop fill" (ODF) technique.

In this example, the liquid crystal display device may include a passive light emitting diode that may control brightness of a screen by using a light emitted from the backlight unit arranged in a backside of the liquid crystal panel.

Technology of attaching a touch screen panel to such the liquid crystal display device has been suggested recently. A touch screen panel is a user interface typically attached to a display device to sense a corresponding touch point by changing an electrical characteristic at a point touched by opaque material, such as a user's finger or pen. When the user's finger or touch pen touches the screen, a touch panel attached to the liquid crystal display device can detect the corresponding touch point information based on the detected information.

The above-described liquid crystal display device with touch panel has several disadvantages: increased cost because of the touch screen panel, decreased yield because of additional process to attach the touch screen panel to the liquid crystal panel, reduced brightness and increased liquid crystal panel thickness.

In another configuration, a photo-sensor may be provided in the display to control the backlight unit based on brightness of external light. Also, some designs have not attached the touch panel to an outside of the display panel, but such design increases the volume of the display panel.

As follows, a conventional liquid crystal display (LCD) device will be described.

Figure 1:
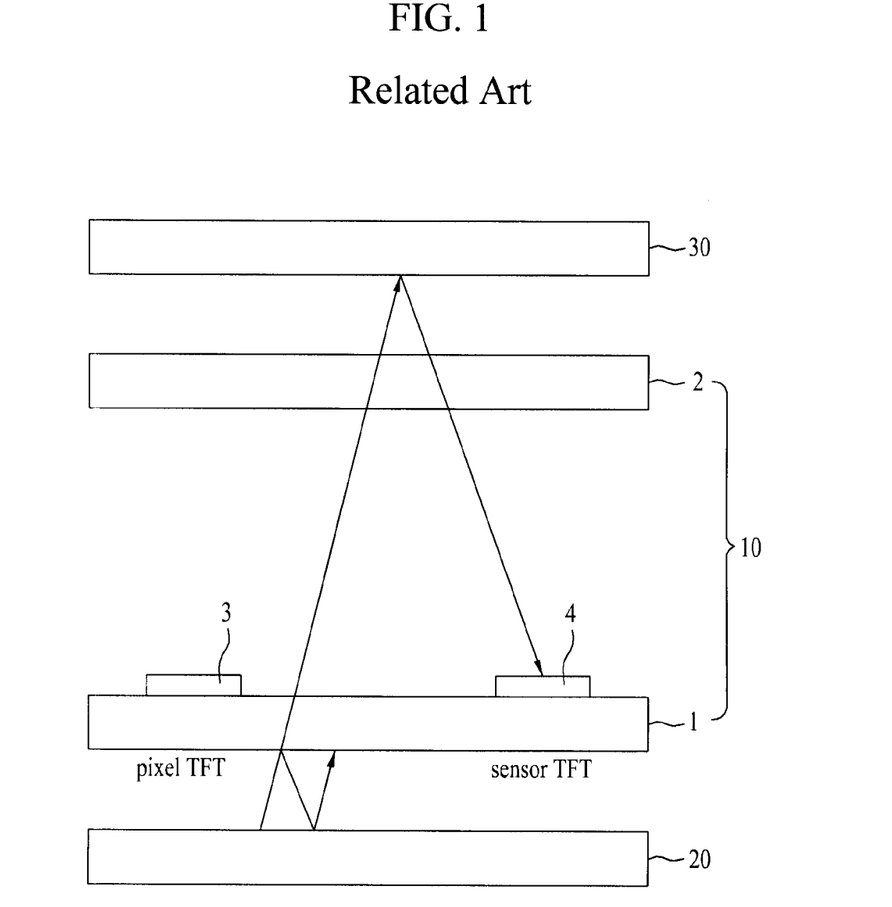
FIG. 1 is a sectional view illustrating a conventional photo-type touch in-cell liquid crystal display device.

FIG. 1 is a sectional view schematically illustrating an LCD device including a conventional photo-type touch panel.

As shown in FIG. 1, an LCD device having a conventional photo-sensing type touch panel embedded therein includes a liquid crystal panel 10 including a first substrate 1, a second substrate 2, a pixel TFT 3 and a sensor TFT 4 and a backlight unit 20 provided under the liquid crystal panel 10 to transmit a light to the liquid crystal panel 10.

Here, according to the photo-sensing, light is emitted through the liquid crystal panel from the backlight unit 20, and the emitted light is reflected toward the liquid crystal panel when a user's finger or a predetermined material 30 touches the liquid crystal panel, to be sensed by the sensor TFT 4.

However, such conventional photo-sensing type touch panel embedded liquid crystal display (LCD) device recognizes touch based on reflection angle of external light, and thus touch sensitivity may be different according to the luminance of the external light. For example, if difference of the amount of light between the external light and an area shaded by touch is none or too little, it is difficult to sense touch.

The above conventional touch panel in-cell type LCD device thus may have following disadvantages.

First, according to the conventional touch panel embedded LCD device, external light as well as the light reflected from the backlight may be recognized. As a result, the sensor may fail to recognize the input signal precisely if the illumination intensity of the reflected light is similar to that of the external light.

Furthermore, as the output signal according to touch is different according to external environment, developing an algorithm for touch point recognition may be complicated. That is, if the external light is higher than the reflected light, the touch signal is may have a voltage lower than voltages of the other area. If the external light is lower than the reflected light, the touch signal is output with a higher voltage than voltages of the other area. As a result, it may be difficult to recognize an actual touch signal. For example, of the external environment has a strong luminance, a shadow may be recognized as touch even though the user's finger is not touching the panel.

SUMMARY OF THE DISCLOSURE

Accordingly, the present invention is directed to a photo-sensing type touch panel embedded liquid crystal display device.

An advantage of the present invention is to provide a photo-sensing type touch panel embedded liquid crystal display device that allows for a soft or light touch and recognition of a touch uniformly regardless of luminance, such as a external light or reflected light and the like.

Additional advantages, objects, and features of the disclosure will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a touch sensing liquid crystal display device comprises a first substrate having a plurality of gate lines and data lines thereon; a second substrate comprising first, second and third color sub-pixel, the second substrate opposed to the first substrate; a first photo-sensor formed on the first substrate, corresponding to the first color sub-pixel; a second photo-sensor formed on the first substrate corresponding to one of the second and third color sub-pixels, wherein said color sub-pixel having the second photo-sensor is adjacent to first color sub-pixel; a liquid crystal layer formed between the first substrate and the second substrate; a wave guide formed on an external surface of the second substrate; and a light emitting diode adjacent to the wave guide, wherein the light emitting diode is capable of emitting light of the same color as the first color sub-pixel.

In one aspect of the present invention external light and the influence of reflected light are identified and blue light is reflected into the panel via the wave guide with respect to the touch sensing area selectively, and then the reflected light is selectively sensed by the blue light sensor such that difference of output signals from the blue light sensor and the other color sensor may be maximized. As result, when the touch is applied, the touch is sensed by the output value of the blue light sensor. Because of that, stable touch sensing is possible without the influence of the external light.

Furthermore, the difference of the light amount and the touch sensing period are applicable without increase of physical contact intensity. As a result, a light or soft touch may be acquired and durability of the product may be improved.

A still further, the photo sensor is provided in the liquid crystal display device and the touch panel may be embedded. As a result, thickness/weight and cost of the product may be economized.

In another aspect of the present invention, a method of sensing touch in a display device comprises sensing a first intensity of light at a first photo-sensor corresponding to an intensity of a first color of light, the first photo-sensor in a first sub-pixel of a first color, wherein the first photo-sensor is connected to a first readout line; sensing a second intensity of light at a second photo-sensor in a second sub-pixel adjacent to the first sub-pixel, wherein the second photo-sensor is connected to a second readout line; determining a touch in a pixel comprising the first and second sub-pixels a voltage difference between the first readout line and the second readout line.

In yet another aspect of the present invention, a method of manufacturing a touch sensing liquid crystal display device comprises forming a first substrate having a plurality of gate lines and data lines thereon and a plurality first photo-sensors thereon corresponding to first color sub-pixels and a plurality of second photo-sensors thereon corresponding to second color sub-pixels, wherein each second color sub-pixel is adjacent to a first color sub-pixel; forming a second substrate comprising first and second color filters corresponding to the first and second color sub-pixels, the second substrate opposed to the first substrate; providing a liquid crystal layer between the first substrate and the second substrate; forming a wave guide on an external surface of the second substrate; and forming a light emitting diode adjacent to the wave guide, wherein the light emitting diode is capable of emitting light of a color corresponding to the first color sub-pixel.

In another aspect of the present invention, a touch sensing display device comprises an upper surface having a wave guide; a light source configured to emit light of a pre-determined color along the wave guide; a plurality of pixel regions, each pixel region comprising a first sub-pixel of the pre-determined color and a second sub-pixel of a color different from the pre-determined color; a first photo-senor configured to sense the pre-determined color in the sub-pixel of the pre-determined color; and a second photo-sensor configured to sense the color of the second sub-pixel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF ILLUSTRATED EMBODIMENTS

Reference will now be made in detail to the specific embodiments of the present invention, examples of which are illustrated in the accompanying drawings. Wherever possible, the same reference numbers will be used throughout the drawings to refer to the same or like parts.

As follows, a touch panel embedded liquid crystal display (LCD) device according to the present invention will be described in reference to the accompanying drawings.

Figure 2:
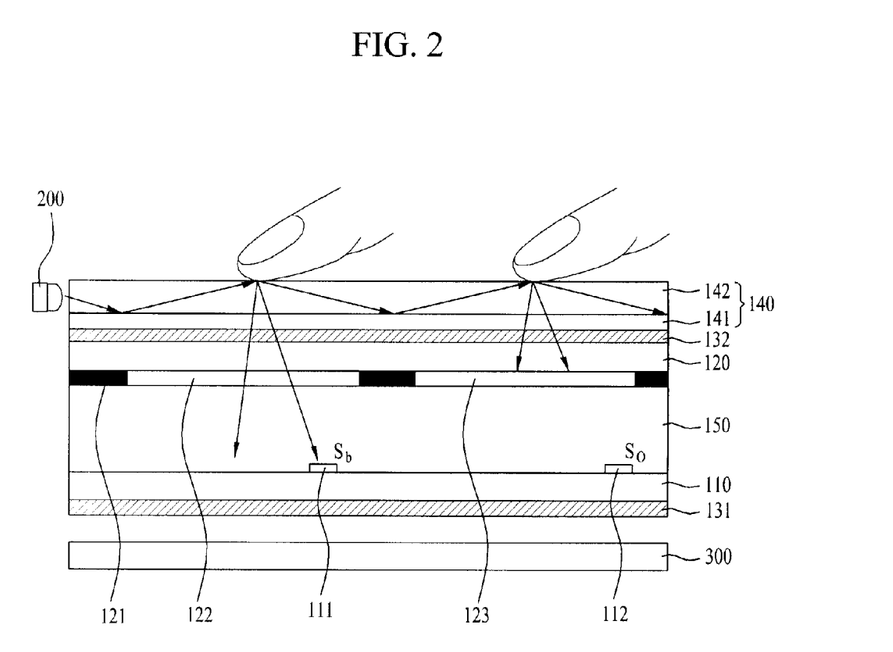
FIG. 2 is a sectional view illustrating a touch panel embedded liquid crystal display device according to principles of the present invention.
Figure 3:
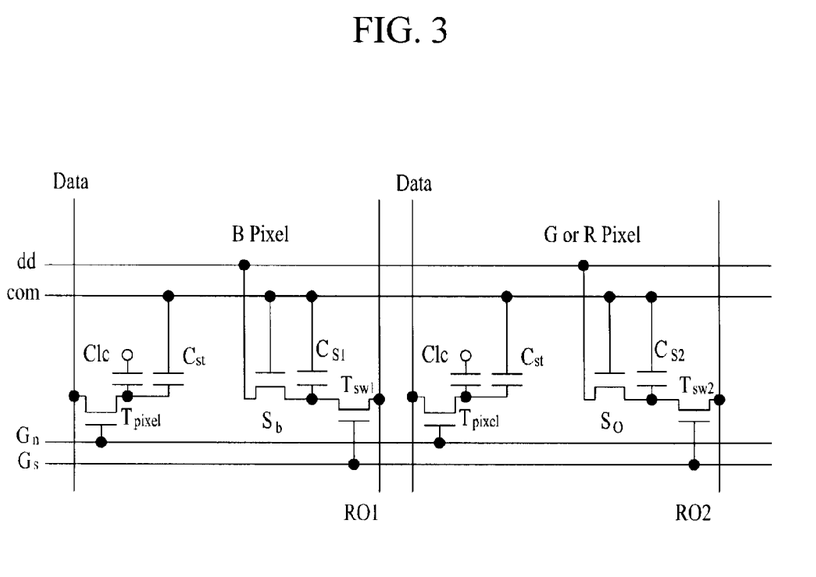
FIG. 3 is a circuit view illustrating a touch-sensing circuit shown in FIG. 2 according to a first embodiment of the present invention.

FIG. 2 is a sectional view illustrating a touch panel embedded liquid crystal display (LCD) device according to the present invention, and FIG. 3 is a circuit view illustrating a touch-sensing circuit shown in FIG. 2 according to a first embodiment of the present invention.

As shown in FIG. 2, the touch panel embedded liquid crystal display (LCD) device includes first and second substrates 110 and 120 facing each other with a liquid crystal layer 150 provided between the first and second substrates 110 and 120, a first planarization plate 131 attached to a rear surface of the first substrate 110, a second planarization plate 132 attached to a rear surface of the second substrate 120, a backlight unit 300 positioned under the first planarization plate 131 and a wave guide 140 on the second planarization plate 132. The wave guide 140 may be integrally formed with the second planarization plate 132. A blue light emitting diode 200 for selectively emitting only a blue color is provided in a predetermined portion adjacent to the wave guide 140.

As illustrated, the wave guide 140 is multilayered with a first film layer 141 and a second film layer 142, sequentially. A refraction index of the first film layer 141 may be larger than a refraction index of the second film layer 142 because the first film layer 141 is formed relatively close to an upper surface of the second planarization plate 132.

The first film 141 may be formed as air gap such that a space (not shown) is provided between the second film layer 142 and the second planarization plate 132 to maintain a gap there between. In this case, the second film layer 142 may be formed of dielectric material having a refraction index larger than a refraction index of the first film layer 141.

The first film layer 141 may further include a bonding member formed of predetermined material having a refraction index smaller than the first film layer 141 to be bonded to the second planarization plate 132 as the second film layer 142.

The wave guide 140 includes a touch contact surface that may be directly touched by a user's finger or pen. The wave guide 140 may total-reflect the light emitted from the blue light emitting diode 200 toward the panel when the touch contact surface is contacted by a user's finger or pen. The wave guide may also function as protection film.

A plurality of pixels having a unit pixel including blue, green and red sub-pixels, respectively, may be aligned in a matrix on the first and second substrates 110 and 120. A blue color filter layer 122, a green color filter layer 123 and a red color filter layer (not shown) are formed on the second substrate 120, corresponding to the blue, green and red sub-pixels. Black matrix layers 121 are formed in areas between the blue, green and red color filter layers 122, 123 and not shown) to cover the areas therebetween. Alternatively, the blue, green and red color filter layers may overlap with the black matrix layer 121.

The blue color filter layer 122 is formed of pigment that is able to transmit the blue color light there though while the green and red color filter layers (123 and not shown) are formed of pigment that is able to absorb the blue color.

Due to the characteristics of the above pigments, the light emitted from the light emitting diode 200 is reflected toward the first light sensor 111 when the wave guide 140 is touched.

A first photo-sensor 111 corresponding to the blue color filter layer 122 and a second photo-sensor 112 corresponding to the green color filter or red color filter layer may be formed on the first substrate 110. The first and second sensors 111 and 112 sense the blue light and the other lights by detecting difference the amount of the blue and other lights of the external light reflected toward the inside of the panel from the touch point. According to one aspect, there is a difference in the intensity of blue light and the other light at the wave guide 140 and the light emitting diode 200 when the panel is touched. For example the other color lights may be absorbed by the second substrate 120 and only the blue light may be sensed by the first photo-sensor 111.

An advantage to the wave guide 140 being multi-layered with the films 141 and 142 having different refraction indexes is that the blue light incident from the blue light emitting diode 200 can be substantially total-reflected in the second film layer 142.

If touch is applied to the wave guide 140 having the above configuration, the refraction index of the second film layer 142 changes, and the blue light inside the second film layer 142 is incident on the color filter layer via the first film layer 141.

At this time, the blue light incident on the blue color filter layer 122 reaches the first photo-sensor 111 positioned in the panel, passing the blue color filter layer 122. In contrast, the blue light incident on the green color filter layer 123 or the red color filter layer is absorbed by the green color filter layer or the red color filter layer and does not reach the second photo-sensor 112 positioned in the panel. As a result, difference of output values of the first photo-sensor 111 and the second photo-sensor 112 may be maximized.

In the present embodiment, the blue light emitting diode 200 is provided as mentioned above; the first photo-sensor 111 is arranged in the blue color sub-pixel; and the second photo-sensor 112 is provided in the other color sub-pixel. The present invention is not limited thereto. For example, a light emitting diode emitting one of red, green and blue colors may be provided and a first photo-sensor may be arranged in a corresponding color sub-pixel and a second photo-sensor may be arranged in neighboring sub-pixel of another color to identify a difference between the external light and the reflection light generated by a touch.

It may be preferred that the light emitting diode emitting blue light is provided, with the first photo-sensor corresponding to the blue sub-pixel and the second photo-sensor corresponding to the red sub-pixel. In this case, the difference of the light amounts between the external light and the reflection light generated by the touch may be identified efficiently. Here, when the backlight unit 300 is arranged with alignment of red, green and blue LEDS, the blue light emitting diode (blue LED) 200 is useable.

As illustrated in FIG. 3, the touch sensing circuit according to the first embodiment includes the first and second photo-sensors 111 and 112 and this configuration will be described in detail.

Here, the first substrate 110 includes gate lines (not shown, see Gn of FIG. 3) and data lines (not shown, see Vdatam of FIG. 3), a pixel transistor Tpixel, a switching line Gs, common lines corn, power voltage lines dd, a liquid crystal cell capacitor C1c, storage capacitor Cst and readout lines RO1 and RO2. The gate and data lines cross each other on the first substrate 111 with necessary insulation layers therebetween. The pixel transistor Tpixel is formed in each cross area between the gate lines and the data lines. The switching line Gs is substantially parallel to the gate line Gn. The liquid crystal cell capacitor C1c and the storage capacitor Cst1 are connected to the pixel transistor Tpixel. The readout lines RO1 and RO2 are in substantially parallel to the data line Data. Here, the switching line Gs may be useable as the gate line Gn.

The first photo-sensor 111 includes a first sensor transistor Sb, a first sensor capacitor Cs1 and a first switching transistor Tsw1. The first sensor transistor (Sb) is formed corresponding to the switching line Gs, the common line corn, power voltage line dd and a first readout line RO1, and the first sensor transistor Sb is driven by a sampling signal applied by the power voltage line dd. The first sensor capacitor Cs1 stores a signal sensed by the first sensor transistor Sb. The first switching transistor Tsw1 is connected to the first sensor capacitor Cs1 and is switchable according to a signal applied by the switching line Gs to transmit a signal to the first readout line RO1.

The second photo sensor 112 includes a second sensor transistor So, a second sensor capacitor Cs2 and a second switching transistor Tsw2. Here, the first photo-sensor 111 in a blue sub-pixel and the second photo-sensor 112 is formed in a green or red sub-pixel adjacent that is adjacent to the blue sub-pixel. Both the first and second photo-sensors 111 and 112 are connected to the same switching line Gs, the common line corn and the power voltage line dd. Meanwhile, the first and second switching transistors Tsw1 and Tsw2 are connected to the first and second readout lines RO1 and RO2, respectively, and the first and second pixel transistors Tpixel1 and Tpixel2 in different sub pixels are connected to different data lines, respectively.

Operation of the above touch sensing circuit according to the first embodiment will be described as follows.

The photo-sensing function of the first and second photo-sensors 111 and 112 is substantially the same and thus only the photo-sensing operation of the first photo-sensor 111 will be described.

If the switching line Gs is enable-driven, a high phase level signal (on:high) is applied to the power voltage line dd and the first sensor transistor Sb generates a photoelectric current (i). The first sensor capacitor Cs1 stores a voltage according to this photoelectric current (i) therein. Then, the first switching transistor Tsw1 transmits the voltage of the first sensor capacitor Cs1 to the first readout line RO1.

A first frame is divided into a display period and a touch sensing period. Each signal of the switching line Gs and the power voltage line dd is supplied to the touch-sensing period. In the display period, corresponding voltage signals are applied to the gate line Gn, data line. Data, and the common line corn to drive the pixel transistor Tpixel causing the liquid crystal cell transistor C1c to display an image of each sub-pixel.

The blue light emitting diode 200 is driven in the touch-sensing period to emit and to transmit the blue light. When the touch is sensed, only the first photo-sensor 111 outputs an output signal to sense the light reflected into the panel from the blue light emitting diode 200. Then the difference between the output value from the first photo-sensor 111 and the output value from the second photo-sensor 112 is determined.

When the blue light emitting diode 200 is turned off in an external sensing period (or because there is no touch); the blue, green and red lights are incident on the panel uniformly. Thus, there is little difference between the outputs values from the first photo-sensor 111 and the second photo-sensor 112. According to the present invention, when there is a reflection of the light from the LED as a result, the output values of the first and second photo-sensors 111 and 112 of the touch are different. As a result, whether a sensor output is a result of a touch or a result of external light influences can be determined.

Here, the blue light emitting diode 200 may be replaced with a diode emitting infrared light. In this case, a light emitting timing point corresponds to the touch sensing period.

Figure 4:
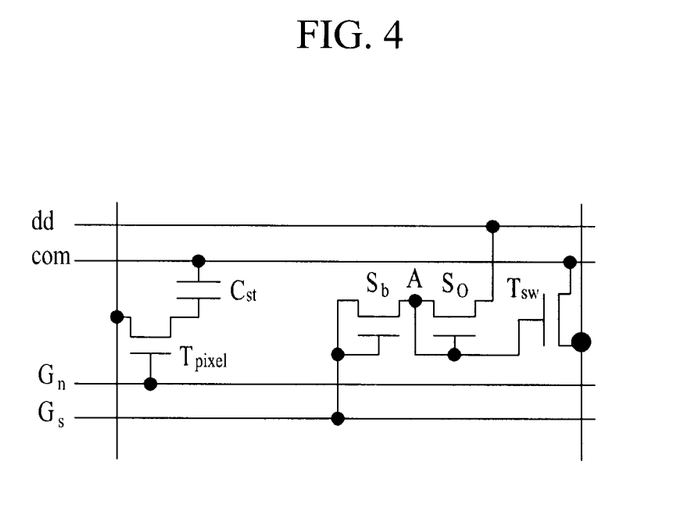
FIG. 4 is a circuit view illustrating a touch-sensing circuit shown in FIG. 2 according to a second embodiment of the present invention.

FIG. 4 is a circuit view illustrating a touch-sensing circuit of FIG. 2 according to the second embodiment.

As shown in FIG. 4, according to the touch-sensing circuit according to this embodiment, a first photo-sensor 111 and a second photo-sensor 112 are connected to a single readout line RO. In this case, a first sensor transistor Sb of the first photo sensor 111 and a second sensor transistor So of the second photo-sensor 112 are positioned corresponding to a first color sub-pixel and a second sub-pixel adjacent to the first color sub-pixel. For example, the first photo sensor 111 and the second photo-sensor 112 are arranged corresponding to a single pixel including first, second, and third color sub-pixels adjacent to each other, among a switching line Gs, a common line com, a power voltage line dd and the readout line RO. The first photo sensor 111 includes a first sensor transistor Sb driven by a sampling signal applied by the switching line Gs and a switching transistor Tsw switchable by a signal sensed by the first sensor transistor Sb to transmit the sensed signal to the readout line RO.

The second photo-sensor 112 includes a second sensor transistor So driven by the signal sensed by the first sensor transistor Sb, receiving a signal from the power voltage line dd, and the second switching transistor Tsw mentioned above. That is, the first photo-sensor 111 and the second photo-sensor 112 share the single switching transistor Tsw.

Specifically, the first sensor transistor Sb and the second sensor transistor So are diode-connected and they are connected in serial. Node A between the first sensor transistor Sb and the second sensor transistor So is connected to a gate electrode of the switching transistor Tsw. The first sensor transistor Sb is diode-connected to the switching line Gs, and a drain electrode of the first sensor transistor Sb is connected to Node A. The second sensor transistor So is diode-connected to the Node A, and a drain electrode of the second sensor transistor So is connected to the power voltage line dd. Also, a source electrode of the switching transistor Tsw is connected to the common line and a drain electrode thereof is connected to the readout line.

Being diode-connected, the first sensor transistor Sb and the second sensor transistor So are in reverse bias when their gates electrodes are off, and in forward bias when the gates electrodes are on.

Operation of the above touch sensing circuit according to the second embodiment will be described as follows.

When the switching line Gs is off, the reverse bias is applied to each of the sensor transistors Sb and So, and no currents flow. When the switching line Gs is on, a voltage at Node A is different according to a resistance ratio of the sensor transistors Sb and So. When the touch is sensed, resistance of the first sensor transistor Sb decreases and a relatively high voltage is applied to Node A such that conductance of the switching transistor Tsw may increase to gain a high voltage value.

Each of the first sensor transistor Sb, the second sensor transistor So and the switching transistor Tsw includes a gate electrode and a source/drain electrode. A semiconductor layer is provided between the gate electrode and the source/drain electrode and these electrodes and the semiconductor layer may be formed together in the pixel transistor fabrication process.

The semiconductor layer may be formed of an amorphous silicon layer and an impurity layer formed on the amorphous silicon layer to contact with the source/drain electrode or the semiconductor layer may be formed of polysilicon. In the latter case, an area in contact with the source/drain electrode is doped. The semiconductor layer may be formed of organic semiconductor layer.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch sensing liquid crystal display device comprising:
   a first substrate having a plurality of gate lines and data lines thereon;
   a second substrate comprising first, second and third color sub-pixel, the second substrate opposed to the first substrate;
   a first photo-sensor formed on the first substrate, corresponding to the first color sub-pixel;
   a second photo-sensor formed on the first substrate corresponding to one of the second and third color sub-pixels, wherein said color sub-pixel having the second photo-sensor is adjacent to first color sub-pixel;
   a liquid crystal layer formed between the first substrate and the second substrate;
   a wave guide formed on an external surface of the second substrate;
   a light emitting diode adjacent to the wave guide, wherein the light emitting diode is capable of emitting light of the same color corresponding to a first color of the first color sub-pixel; and
   a backlight unit under the first substrate,
   wherein light emitted from the light emitting diode is reflected at the wave guide when the wave guide is touched and
   wherein the first photo-sensor senses the reflected light through the first color sub-pixel while the second and the third color sub-pixels absorb the reflected light.

2. The touch sensing liquid crystal display device of claim 1, further comprising a first readout line having a voltage thereon corresponding to an intensity of light sensed by the first photo-sensor and a second readout line having a voltage thereon corresponding to an intensity of light sensed by the second photo-sensor.

3. The touch sensing liquid crystal display device of claim 2, further comprising a detector to determine a voltage difference between the first readout line and the second readout line.

4. The touch sensing liquid crystal display device of claim 3, further comprising a readout line connected to the detector.

5. The touch sensing liquid crystal display device of claim 1, wherein the first color sub-pixel is a blue sub-pixel.

6. The touch sensing liquid crystal display device of claim 1, wherein the second color sub-pixel is one of a red sub-pixel and a green sub-pixel.

7. The touch sensing liquid crystal display device of claim 1, the wave guide comprising a first layer and a second layer, the first layer having an index of refraction different from the index of refraction of the second layer.

8. The touch sensing liquid crystal display device of claim 7, wherein the index of refraction of the second layer to be contact with an object is greater than an index of refraction of the first layer.

9. The touch panel embedded liquid crystal display device of claim 8, wherein the first layer is an air gap.

10. A method of sensing touch in a display device, the method comprising:
    providing a display device including an upper surface having a wave guide, a light emitting diode configured to emit light of a first color along the wave guide, a display panel having a plurality of pixel regions under the wave guide, each pixel region comprising a first sub-pixel of the first color and a second sub-pixel of a second color being different from the first color, a first photo-sensor configured to sense the light of the first color emitted from the light emitting diode in the sub-pixel of the first color, a second photo-sensor configured to sense the second color of the second sub-pixel and a back light unit under the display panel;
    sensing a first intensity of light at the first photo-sensor corresponding to an intensity of the first color of light, the first photo-sensor in the first sub-pixel of the first color, wherein the first photo-sensor is connected to a first readout line;
    sensing a second intensity of light at the second photo-sensor in the second sub-pixel adjacent to the first sub-pixel, wherein the second photo-sensor is connected to a second readout line;
    determining a touch in a pixel comprising the first and second sub-pixels according to a voltage difference between the first readout line and the second readout line,
    wherein light emitted from the light emitting diode is reflected at the wave guide when the wave guide is touched and
    wherein the first photo-sensor senses the reflected light through the first color sub-pixel while the second and the third color sub-pixels absorb the reflected light.

11. The method according to claim 10, wherein the first color sub-pixel is a blue sub-pixel.

12. The method according to claim 10, wherein the second color sub-pixel is one of a red sub-pixel and a green sub-pixel.

13. A method of manufacturing a touch sensing liquid crystal display device, comprising the steps of:
    forming a first substrate having a plurality of gate lines and data lines thereon and a plurality first photo-sensors thereon corresponding to first color sub-pixels and a plurality of second photo-sensors thereon corresponding to second color sub-pixels, wherein each second color sub-pixel is adjacent to a first color sub-pixel, wherein the first photo-sensors and the second photo-sensors senses light of different colors;
    forming a second substrate comprising first and second color filters corresponding to the first and second color sub-pixels, the second substrate opposed to the first substrate;
    providing a liquid crystal layer between the first substrate and the second substrate;
    forming a backlight unit under an external surface of the first substrate;
    forming a wave guide on an external surface of the second substrate; and
    forming a light emitting diode adjacent to the wave guide, wherein the light emitting diode is capable of emitting light of the same color corresponding to the color of light sensed by the first photo sensor in the first color sub-pixel,
    wherein light emitted from the light emitting diode is reflected at the wave guide when the wave guide is touched and
    wherein the first photo-sensor senses the reflected light through the first color sub-pixel while the second and the third color sub-pixels absorb the reflected light.

14. The method of claim 13, wherein the first color sub-pixels are blue sub-pixels.

15. The method of claim 13, wherein the second color sub-pixels are one of green sub-pixels and red sub-pixels.

16. A touch sensing display device comprising:
- an upper surface having a wave guide;
- a light emitting diode configured to emit light of a pre-determined color along the wave guide;
- a display panel having a plurality of pixel regions under the wave guide, each pixel region comprising a first sub-pixel of the pre-determined color and a second sub-pixel of a color different from the pre-determined color;
- a first photo-sensor configured to sense the pre-determined color in the sub-pixel of the pre-determined color;
- a second photo-sensor configured to sense the color of the second sub-pixel, wherein the color of the second sub-pixel is different from the pre-determined color; and
- a back light unit under the display panel,
- wherein light emitted from the light emitting diode is reflected at the wave guide when the wave guide is touched and
- wherein the first photo-sensor senses the reflected light through the first color sub-pixel while the second and the third color sub-pixels absorb the reflected light.

\* \* \* \* \*